July 7, 1970
H. I. ROGERS
3,519,202
APPARATUS AND SIMPLIFIED PROCEDURE FOR BILLING
FOR CREDIT PURCHASES AND THE LIKE
Filed Dec. 20, 1965
6 Sheets-Sheet 1
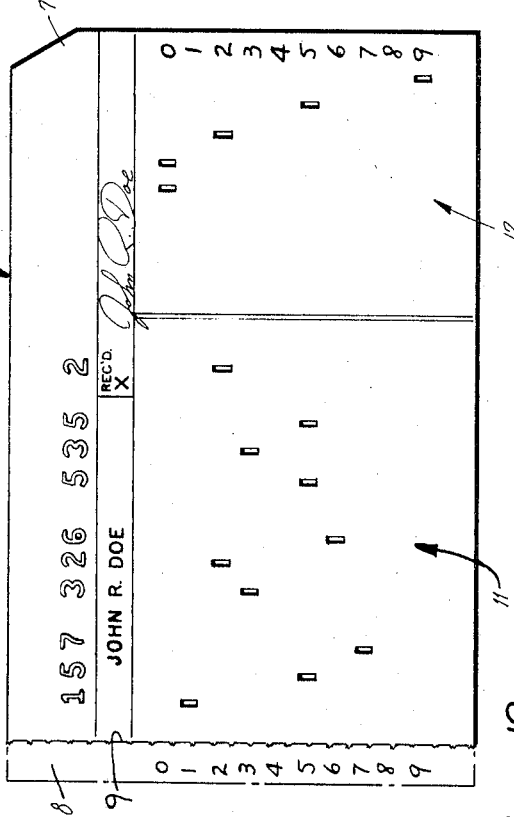
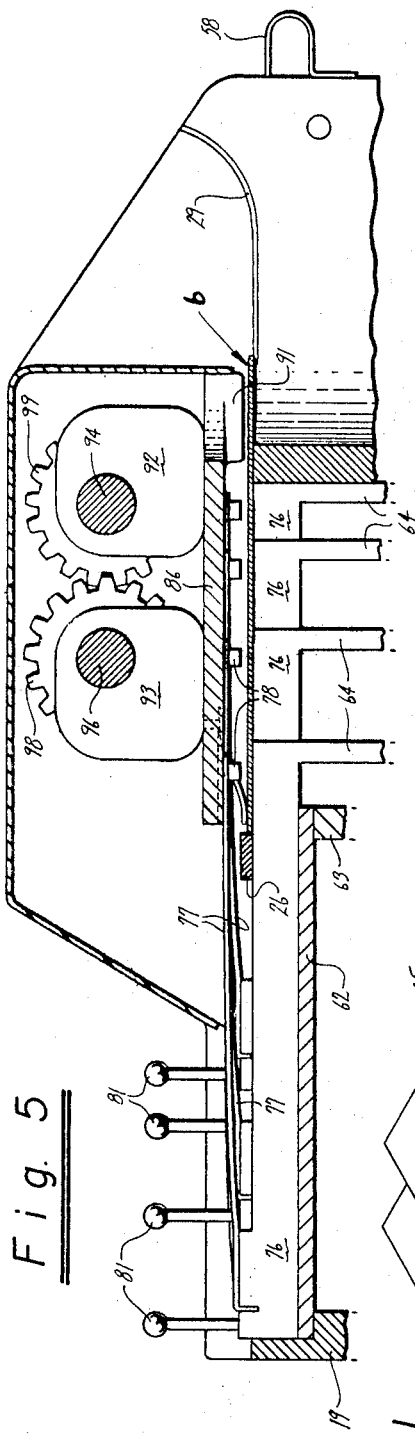
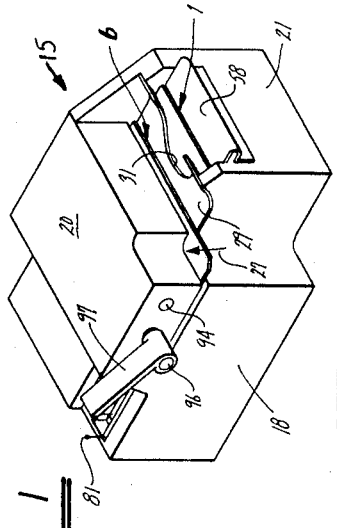
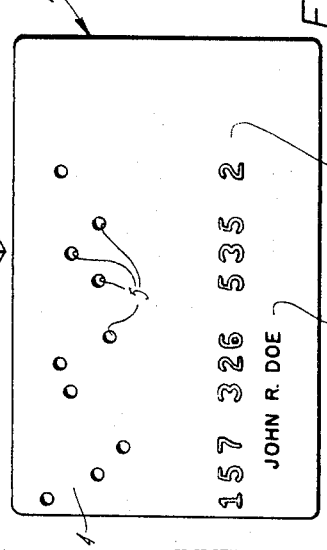
INVENTOR.
Herbert I. Rogers
BY
Boykin, Mohler, Foster & Schlemmer
Attorneys INVENTOR.
Herbert I. Rogers July 7, 1970

H. I. ROGERS 3,519,202

APPARATUS AND SIMPLIFIED PROCEDURE FOR BILLING
FOR CREDIT PURCHASES AND THE LIKE

Filed Dec. 20, 1965

INVENTOR.
Herbert I. Rogers
BY
Boykzen, Mohler, Foster & Schlemmer
Attorneys

INVENTOR.
Herbert I. Rogers
BY
Boyken, Mohler, Foster & Schlemmer
Attorneys

INVENTOR.
Herbert I. Rogers

United States Patent Office 3,519,202
Patented July 7, 1970

3,519,202
APPARATUS AND SIMPLIFIED PROCEDURE FOR BILLING FOR CREDIT PURCHASES AND THE LIKE
Herbert I. Rogers, 1125 Taylor St.,
San Francisco, Calif. 94108
Filed Dec. 20, 1965, Ser. No. 514,813
Int. Cl. G06k 1/20, 19/00, 1/14
U.S. Cl. 234—35         13 Claims

ABSTRACT OF THE DISCLOSURE

Mechanical apparatus for applying machine readable indicia onto a record slip in accordance with coded indicia carried by a master card. Insertion of the master card effects automatic positioning of indicia applying elements relative to the record slip. The apparatus also includes other selectively positionable indicia applying elements for adding cost data or the like to the recorded slip. Handle operable means move the indicia applying elements simultaneously into engagement with the record slip. Use of the apparatus eliminates a separate key punch operation during the billing procedure for the purchase covered by the record slip.

---

This invention relates generally to simplifying procedures encountered in billing for purchases made in conjunction with a credit card system. More particularly, this invention relates to a simplified billing procedure for credit purchases in which one step in the usual billing procedure is completely eliminated when this invention is practiced. Still more particularly, this invention relates to apparatus for use at the point of sale of a credit purchase with which all necessary billing information may be applied to a credit purchase record slip, thereby simplifying the billing procedure required when such record slip is forwarded to billing headquarters for processing.

Hereinafter, for purposes of illustration, reference will be directed to utilization of this invention in conjunction with a gasoline company credit card system. However, it should be understood that this invention is equally well suited for use with other types of credit systems and procedures, as well as with non-credit procedures in which it is desired to place machine readable indicia on a record slip at the point of origin of such slip to simplify subsequent processing thereof on automatic machinery.

With conventional credit purchase billing systems commonly used by gasoline companies at the present time, a credit purchaser is issued a master credit card bearing identifying indicia, such as his name and a multi-digit identification number. When a credit purchase is made at a gasoline station by a credit card holder, his name and identification number are printed by suitable apparatus on a credit purchase record slip, and the nature of the goods purchased and their monetary amount are written on the record slip by the gasoline station attendant. Thereafter, part of the record slip is given to the customer and the remainder is forwarded to the billing headquarters of the gasoline company for use in compiling the credit card holder's total bill for a given time period, such as a one month period.

At billing headquarters it is presently necessary to prepare each record slip covering each purchase made by each of the company's credit customers so that each slip may be read in automatic computer machines employed in the automatic billing procedure of the company. To this end, each record slip is placed individually into a key punch or like machine, and the machine then punches or otherwise applies machine readable indicia into the record slip setting out the identification number of the credit card holder and the cost of the credit purchase covered by the record slip. Thereafter the punched record slip, along with large numbers of other record slips which have been similarly treated, are inserted into automatic machines in which all record slips for a given card holder are segregated, his credit slip purchases are totaled, and a statement covering such purchases is prepared for mailing.

This invention is devised to completely eliminate the intermediate handling step, such as punching or other operation, presently required at a company's billing headquarters during which indicia setting out a card holder's identification number and the cost of a credit purchase are punched or otherwise applied to each record slip prior to introduction thereof into the automatic billing machinery. By utilizing the procedure and apparatus of this invention, all necessary preparation for automatic handing of each record slip is done at the point of sale, such as the gasoline station at which a credit purchase is made. To this end all the necessary identification and cost indicia are applied by a gasoline station attendant utilizing the subject apparatus directly to the record slip prior to transmission of the slip to billing headquarters. Thus, when each record slip is received at billing headquarters it is immediately ready for insertion into the automatic billing machinery without further handling.

Because of the very large numbers of record slips received at the billing headquarters of each major gasoline company during each billing period, the savings in time and money producible from use of this invention to completely eliminate the separate identification and cost indicia applying step is very appreciable.

The usual gasoline credit purchase record slip is of multi-sheeted construction which normally comprises a thin vellum tissue sheet on the top, a double faced carbon therebeneath, and a flexible but sturdy paperboard sheet beneath the carbon. It is the sturdy paperboard sheet which is the "record slip" which is transferred to billing headquarters after the entire record slip has had the appropriate identification and cost indicia applied thereto at the point of sale. The top vellum tissue sheet is given to the credit card holder for his records and the carbon sheet is discarded.

Because this invention is usable in systems other than a credit purchase system, herein the term "record slip" is employed to identify any sheet or card which is transmitted from a point of origin, where indicia has been applied thereto, to a destination at which such indicia is to be read on automatic machinery.

From the foregoing it should be understood that objects of this invention include: the provision of a simplified billing procedure for credit purchases and like procedures in which machine coded indicia is applied to a record slip at a point of origin to be read out on automatic machinery; the provision of apparatus useable at the point of sale of a credit purchase for applying identification and cost indicia to a credit purchase record slip; the provision of such an apparatus in which identification indicia applying means thereof is automatically positionable in response to insertion of a master credit card into the apparatus; and the provision of apparatus for use in a simplified credit purchase billing procedure for punching identification indicia and purchase cost indicia into a record slip which is receivable in automatic billing machinery without requiring intermediate handling at a billing headquarters. These and other objects of this invention will become evident from a study of the following description in which reference is directed to the appended drawings.

FIG. 1 is an isometric view, on a reduced scale, of a preferred embodiment of the indicia applying apparatus of this invention.

FIG. 5 is a vertical sectional view through the apparatus taken generally in the plane of line 5—5 of FIG. 2 showing details of manually movable means for applying other machine readable indicia to a record slip.

FIG. 12 is a plan view of a master credit card useable with the subject apparatus.

FIG. 13 is a plan view of a portion of a record strip to which machine readable indicia have been applied by the subject apparatus.

Figure 2:
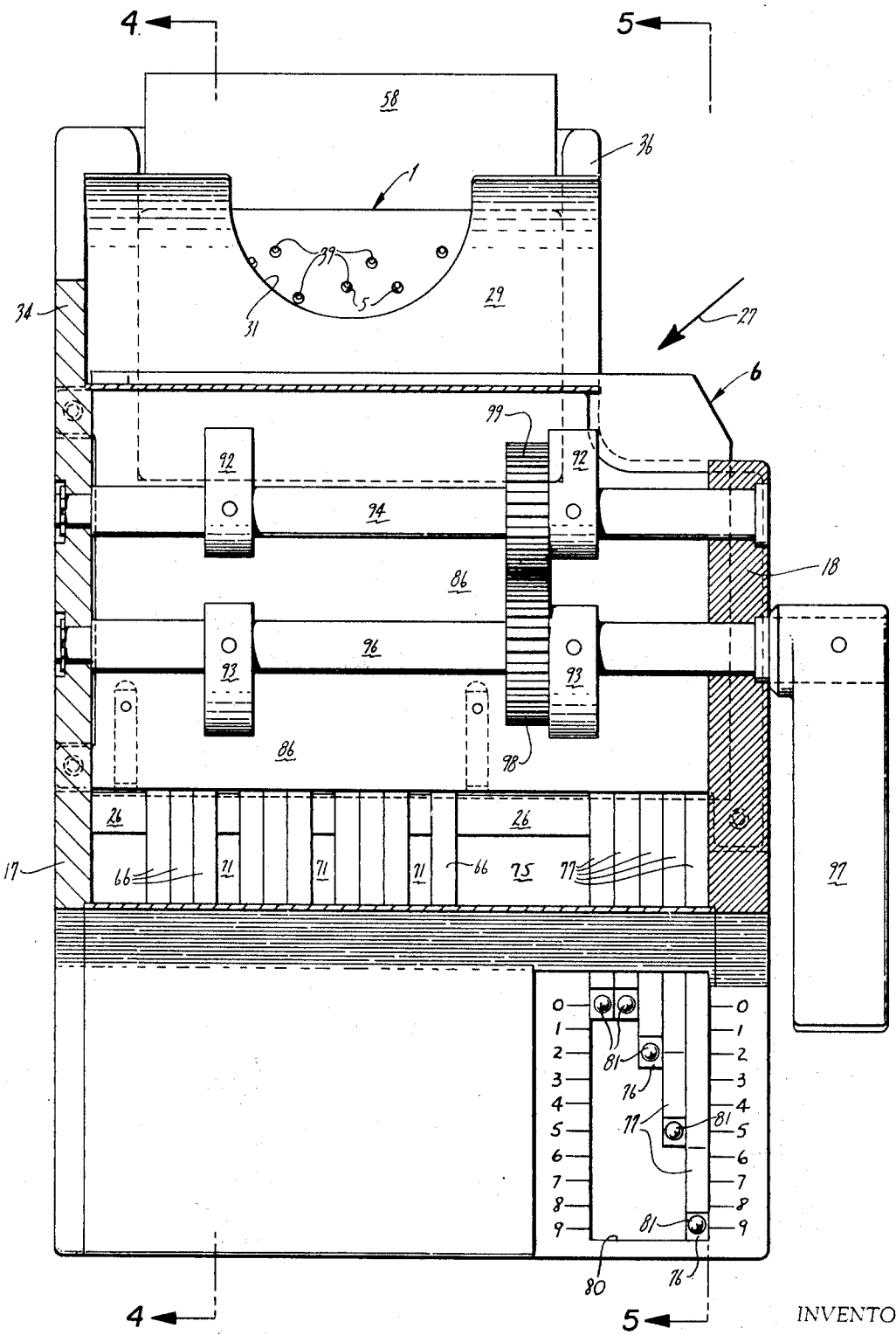
FIG. 2 is a plan view, partially cut away, of the subject apparatus taken generally in the plane of line 2—2 of FIG. 4.

Before describing the subject apparatus, reference is directed to FIGS. 12 and 13 for a representative showing of a credit card and record slip useable in a simplified gasoline company billing procedure employing this invention. FIG. 12 shows the credit card, designated 1, substantially to scale. The card illustrated is of generally conventional construction and is formed from a sturdy plastic or other suitable material, as is well known. In line with known practice, the card includes predetermined card holder identification areas thereon in which identification indicia is located, such as the card holder's name, in area 2, and the identification number, in area 3, which has been assigned to the card holder by the company which issued the card. The name and identification number usually are defined by raised embossments.

The credit card shown differs from credit cards commonly used in that it includes another predetermined area 4 thereon in which machine coded indicia is provided. This coded indicia comprises a series of openings or apertures 5 provided in the card and such apertures are located in accordance with the particular identification number digits assigned to the credit card holder. Thus it should be understood that the ten apertures provided in area 4 of the card correspond, due to their particular placement on the card, to the ten digit identification number provided therebeneath. That is, the card is divided into ten lateral lines extending across the indicia area 4 and each of such lines defines a particular numeral, starting with zero adjacent the top of the card and running through numeral nine just above the raised identification number in area 3.

While the identification number and the coded indicia apertures corresponding thereto in the illustrated card comprise ten digits, it should be understood of course that more than ten or less than ten digits could be provided, as may be required by the requirements of a given company. Although not shown in FIG. 12, it should also be understood that suitable printing may be provided on the card to identify the issuing gasoline company and provide other information found on conventional cards at the present time.

Referring to FIG. 13, that portion of a record slip 6 is shown which is forwarded to billing headquarters after customer identification and cost indicia have been applied thereto. Such a slip, except for the indicia applied thereto, is of conventional construction. That portion of the slip shown is the sturdy paperboard record sheet 7 which underlies the customer's vellum sheet and the double faced carbon, neither of which are shown. It should be understood that the vellum sheet and carbon sheet are connected with a stub 8 of a complete slip, as is underlying record slip 7, along a perforated margin 9 so as to easily separable from the stub.

It will be noted that the record slip has the customer's name and identification number applied thereto adjacent the top margin thereof. This name and number are applied by printing to both the record slip 7 and the vellum customer's copy by the double faced carbon when a complete slip is positioned in the apparatus as will be described. In this regard, the credit card partially overlaps the record slip in the apparatus so that the identification number and name may be printed thereon.

The record slip 7 further includes two areas 11 and 12 thereon in which machine readable coded indicia have been applied thereto, preferably by punching holes therein, by the gasoline attendant. The coded indicia punched in area 11 sets out to the customer identification number carried by the credit card 1. The coded indicia punched in area 12 sets out the monetary amount of the purchase covered by the particular record slip. Thus, by using the subject apparatus the gasoline station attendant applies full customer identification indicia and purchase amount indicia to the record slip at the gasoline station, thereby completely obviating the need for a separate punching or other operation at billing headquarters. As a result, the record slip 7 is introducible directly into automatic billing machinery without requiring intermediate handling.

It should be understood that the record slip is divided into ten lateral lines extending laterally thereacross each of which identifies a given numeral readable on computer machines in known fashion. As shown in FIG. 13 by the numerical scale provided along opposite edges of the slip, the machine readable numerals begin with zero just below the customer's name printed thereon by the credit card, and extend through numeral nine adjacent the lower edge of the slip. Thus the indicia punched in area 11 of the record slip corresponds to the ten digit identification number printed thereabove, and the cost indicia in area 12 indicates the monetary amount of the purchase covered by the record slip. In this latter regard, by way of illustration, it will be noted that the purchase covered by the record slip amounted to $2.59.

Although not shown in conjunction with the record slip, it should be understood that suitable printing may be formed on the record slip identifying the gasoline company, the gasoline station at which the particular purchase took place, and other similar printed matter commonly employed on conventional record slips. Furthermore, an area may be provided in any convenient location on the record slip in which the gasoline station attendant may write in the types of products sold, their unit cost, and the total cost of the purchase, before the record slip is inserted into the apparatus which applies the machine readable identification indicia and cost amount indicia to the record slip.

A preferred embodiment of the indicia applying apparatus provided for use at the point of sale is shown in reduced scale in FIG. 1. Such apparatus, generally designated 15, includes means for receiving and positioning a complete record slip therein in a predetermined location, as well as for receiving and positioning a credit card therein in a predetermined location relative to the record slip so that one overlies the other to permit the credit card holder's name and identification number to be printed on the upper portion of the record slip as described previously.

The apparatus further includes movable means which are selectively positionable relative to the record slip for applying the machine readable identification indicia and the cost indicia to the record slip. As will be described, such movable means for applying the identification indicia is positioned automatically in response to insertion of the credit card into the apparatus, while the movable means for applying the cost indicia is manually positioned by the gasoline station attendant at the point of sale. In this regard, the apparatus further includes means for sensing the coded customer identification apertures in the credit card and such sensing automatically orients the movable identification indicia applying means in predetermined locations in accordance with such coded apertures.

Finally, the apparatus includes means for actuating the respective identification and cost indicia applying means after the same have been properly oriented relative to a given record slip so that such indicia may be applied to the record slip positioned therein.

Figure 3:
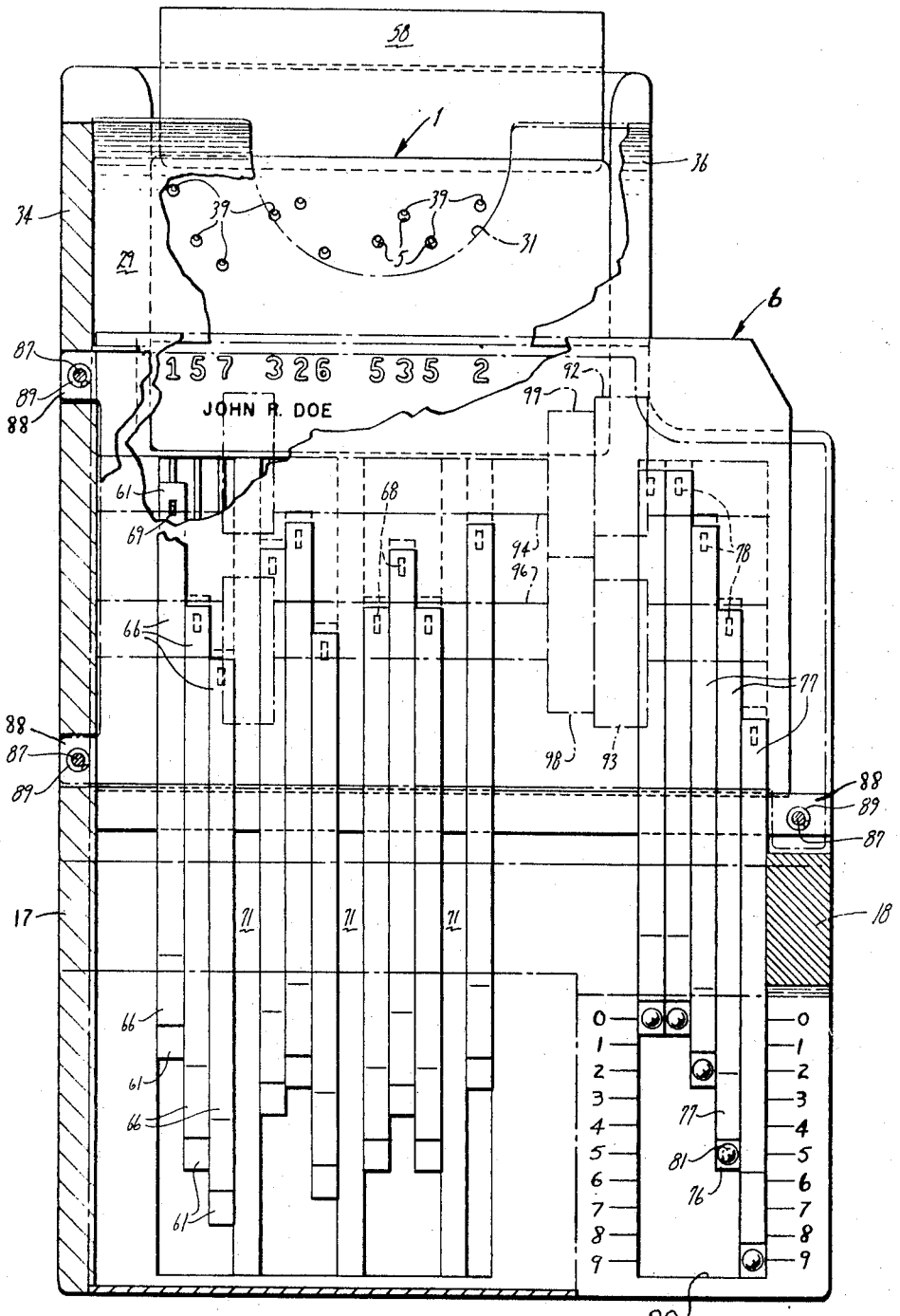
FIG. 3 is a horizontal sectional view through the apparatus taken in the plane of line 3—3 of FIG. 4.
Figure 4:
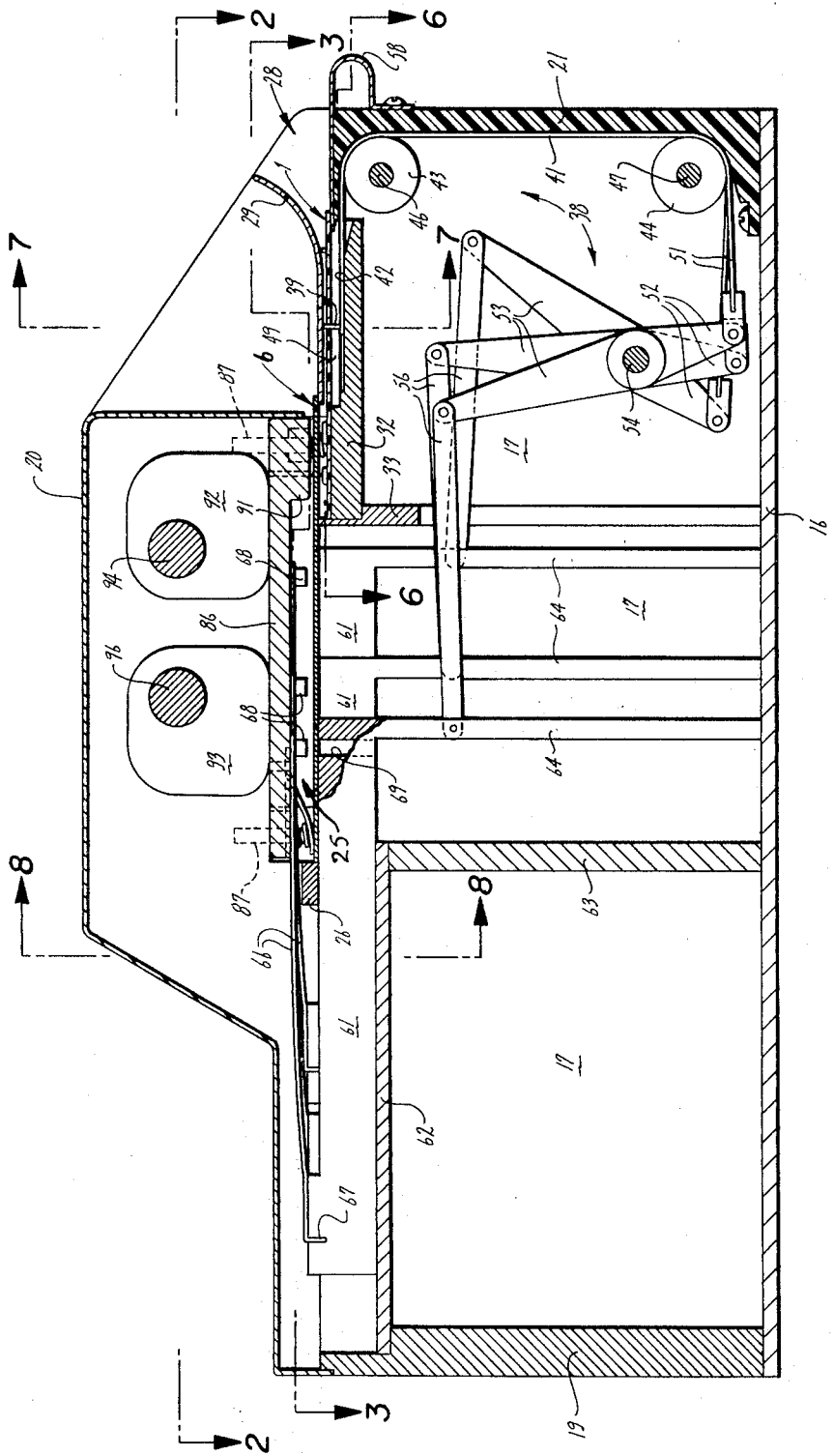
FIG. 4 is a vertical sectional view through the apparatus taken in the plane of line 4—4 of FIG. 2 showing details of the means for applying machine readable indicia to a record slip.

As seen from FIGS. 2, 3 and 4, apparatus 15 comprises housing defined by a bottom 16, opposed side walls 17 and 18, opposed end walls 19 and 21 and a top cover 20. It is between and upon the respective side and end walls of the housing that the various operative components of the apparatus are mounted. The material from which the housing is formed may vary in accordance with particular requirements and, by way of example, sturdy plastics or sheet metals may be employed. Preferably, for the purpose to be described, end wall 21 is formed from a friction reducing plastic of which nylon is exemplary.

The aforementioned means of the apparatus for receiving properly positioning the record slip 6 is defined by a horizontal passageway, generally designated 25 in FIG. 4. Such passageway, as perhaps best seen in FIGS. 2, 4 and 5, is defined at its inner margin by a stop plate 26 extending transversely of the apparatus between the opposite side walls 17 and 18 thereof, and the lateral margins of the passageway are defined by such side walls. Structure for supporting the record slip in the passageway is provided by the movable means for applying the respective machine readable indicia to the record slip, as will be described hereinafter.

Referring to FIG. 2, insertion of the record slip 6 into the passageway may be effected most easily if the slip is moved initially on the bias relative to the apparatus generally in the direction of the arrow 27. This angular insertion of the record slip is continued until the same strikes the side wall 17, after which movement may be continued straight into the apparatus until the stop plate 26 is contacted. Once properly positioned, the record slip lies in the location seen in FIGS. 2 through 5.

As aforementioned, means also is included in the apparatus for receiving and properly positioning the credit card 1 in a predetermined location relative to a record slip positioned in passageway 25 so that at least a portion of the credit card underlies the record slip to permit the card holder's name and identification number to be printed on the record slip. The overlying relationship of the record slip relative to the credit card is perhaps best seen in FIGS. 4 and 11.

Figure 9:
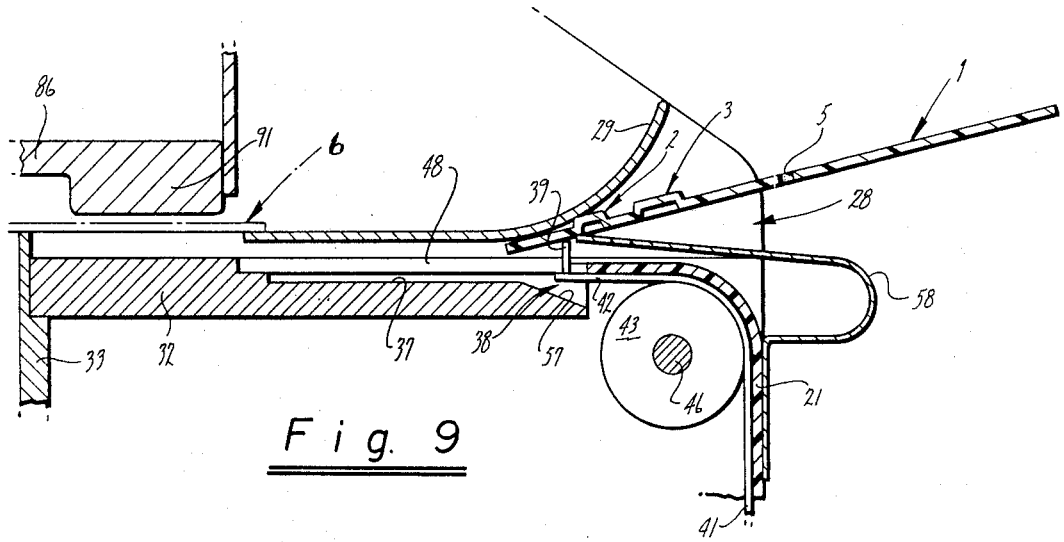
FIGS. 9, 10 and 11 are partial vertical sectional views through the credit card receiving end of the apparatus which illustrate progressive insertion of a credit card into the apparatus and activation thereby of sensing means which controls orientation of indicia applying means directly in response to such insertion.
Figure 11:
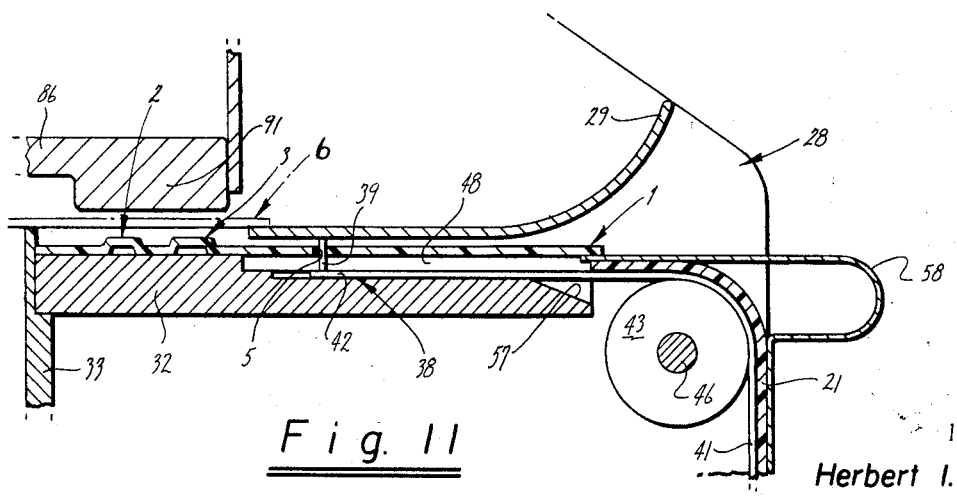

The credit card 1 is receivable in a passageway, generally designated 28 in FIGS. 4 and 9, through 11, the top of which is defined by an upwardly curved guide plate 29 having a half moon cut-out portion 31 therein (FIG. 2) to permit insertion and removal of the credit card beneath the guide plate while the card is held by the gasoline station attendant. The bottom of the credit card passageway is defined by a supporting plate 32, perhaps best seen in FIG. 4, which extends transversely of the housing between the side walls 17 and 18. In conjunction with supporting plate 32 is a transversely extending stop plate 33 against an upper portion of which the credit card comes to rest when properly positioned in the apparatus, as seen in FIGS. 4 and 11. Lateral movement of the credit card is precluded by engagement thereof with longitudinal extensions, designated 34 and 36 respectively, of the side walls 17 and 18 as seen in FIGS. 2 and 3. Thus, when properly positioned in the apparatus the credit card is supported by plate 32 and is held against vertical shifting by guide plate 29 and against lateral shifting by the side wall extensions 34 and 36 of the apparatus housing.

Figure 10:
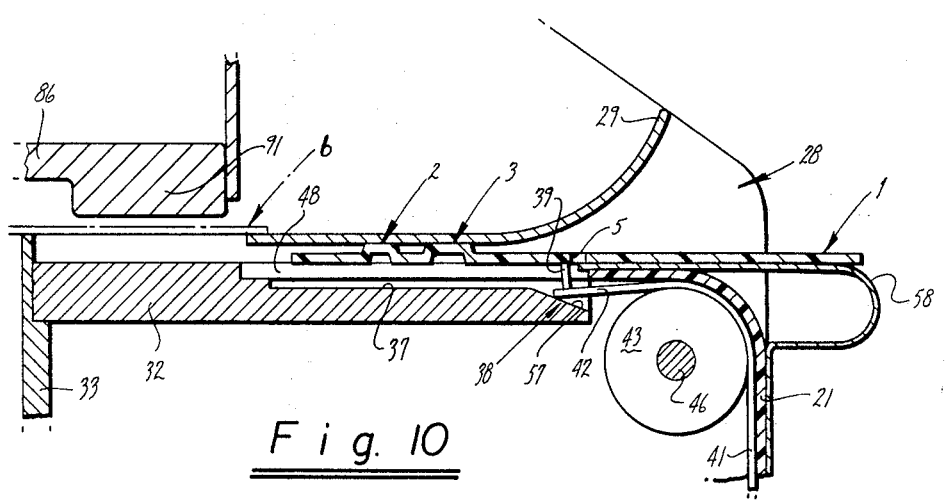

It should be noted from FIGS. 9 and 10 that the supporting plate 32 for the credit card is cut away at 37 for a substantial portion of its length and width to accommodate means of the apparatus provided to sense the coded apertures 5 carried on the credit card. Such sensing means is responsive automatically to insertion of the credit card into its receiving passageway and automatically orients the identification indicia applying means of the apparatus in a predetermined position determined by the coded apertures 5 provided in the credit card. That is, the sensing means becomes automatically engaged with the respective apertures 5 in the credit card as the credit card is inserted into the apparatus and thereby automatically positions the movable identification indicia applying means relative to the record slip 6 in accordance with the identification number carried by the credit card.

In the preferred embodiment of the apparatus shown, such sensing means, generally designated 38, comprises a series of discrete sensing members 39 each of which is defined by an upstanding rigid pin positioned to be engaged with and received in an aperture 5 in the credit card. The sensing means further includes a series of discrete movable connector structures each of which comprises a flexible metal connecting link 41 from adjacent one end 42 of which a pin 39 projects as seen in FIGS. 4 and 9 through 11. Each flexible link preferably is formed from a resilient strip of bendable metal capable of being repeatedly distorted without destroying its resilient characteristics.

Figure 7:
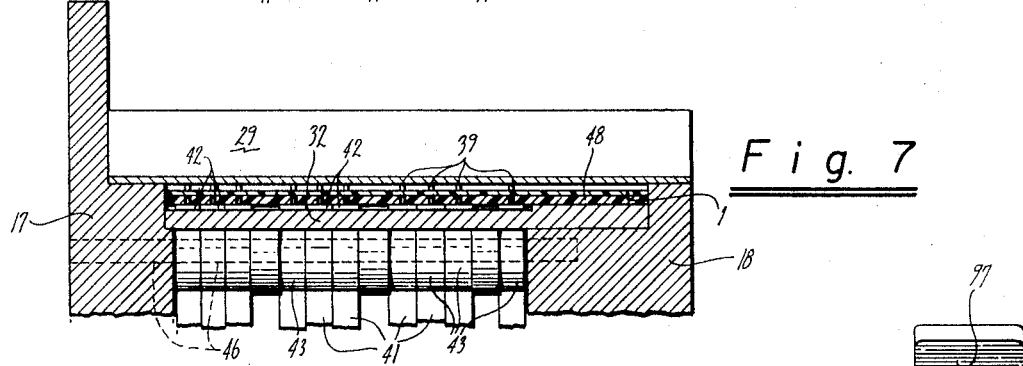
FIG. 7 is a partial vertical sectional view through the apparatus taken in the plane of line 7—7 of FIG. 4.

Each such flexible link as supported for movement in guide means defined by a pair of vertically spaced rollers 43 and 44 which are freely rotatable on mounting shafts 46 and 47 respectively which extend between the opposite side walls of the apparatus casing. The aforementioned plastic end wall 21 engages each flexible link and maintains the same engaged with its associated guide rollers 43 and 44 while at the same time minimizing friction between each movable link and the end wall. It should be understood that each of the supporting shafts 46 and 47 have mounted thereon a plurality of guide rollers 43 and 44, the number of which on each shaft corresponds to the number of links 41 employed in the sensing means, as seen in FIG. 7. The number of links in turn is determined by the number of sensing pins 39 required in the apparatus to sense and be received in the apertures provided in a given credit card. In this regard, with the credit card illustrated herein, which employs a ten digit identification number, ten sensing pins and ten connecting links are employed.

It will be noted from FIG. 12, however, that with the identification number shown, spaces occur between each of the three sets of three digit groupings and between the last grouping of one digit. Sensing pins are not required in those areas because of the absence of coded apertures therein. However, it should be understood that sensing pins, and associated connecting links, may be provided in those areas if required to accommodate a thirteen digit member, for example. But for a ten digit number, spacer means to be described are provided in those areas which require no sensing pins.

Figure 6:
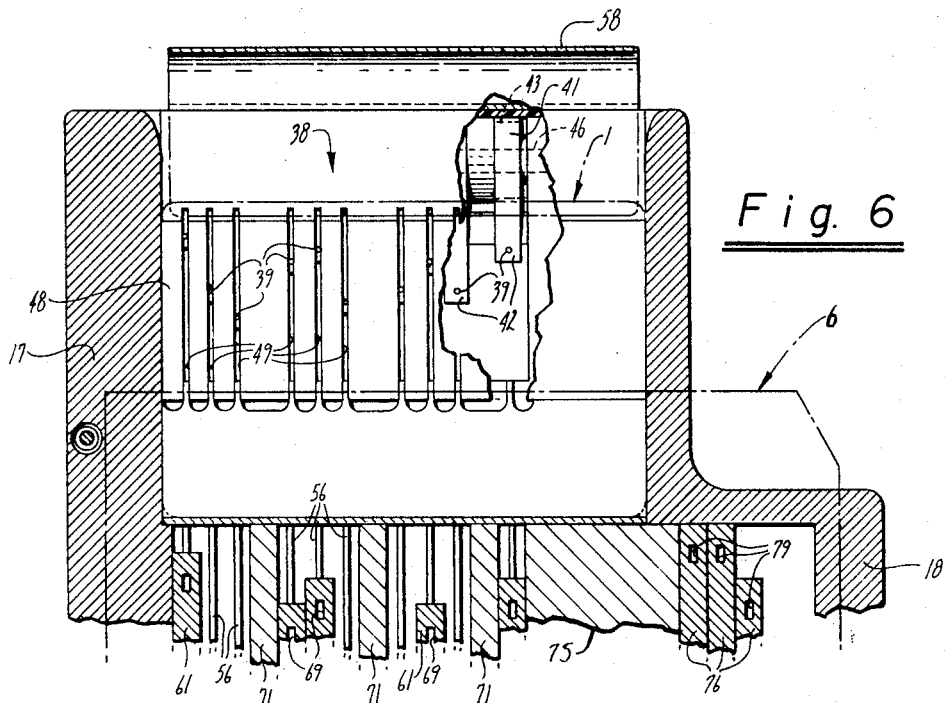
FIG. 6 is a partial horizontal sectional view through the apparatus taken in the plane of line 6—6 of FIG. 4.

To guide the sensing pins during their travel a slotted guide plate 48, as perhaps best seen in FIG. 6, is provided in conjunction with the aforementioned supporting plate 32 for the credit card. The slotted guide plate 48 includes a series of parallel slots 49 which extend longitudinally of the apparatus and a sensing pin 39 is slidably receivable in each such slot. Referring again to FIG. 4, it will be noted that each end 42 of each link 41 from which a pin 39 projects is slidably receivable between the slotted guide plate 48 and the credit card supporting plate 32 in the space provided by the aforementioned cutout portion 37 provided in the latter.

As also seen in FIG. 4, the opposite end 51 of each of the flexible connecting links 41 is connected with the lower end 52 of an associated pivotally mounted arm 53. The number of such arms 52 corresponds to the number of sensing pins 39 and connecting links 41 actuated thereby. Each pivotal arm 53 is supported on a pivot mounting shaft 54 which extends transversely of the housing between the opposite side walls 17 and 18 thereof. Each of the pivotal arms is connected at its upper end with a connecting rod 56 which in turn is operatively connected with the aforementioned movable means for applying the identification indicia to a record slip 6 positioned in the apparatus, as will be described hereinafter.

Referring to FIGS. 4, 6 and 9 through 11, operation of the sensing means in response to insertion of a credit card into the apparatus will be described. As mentioned previously, it should be understood that each of the projecting sensing pins 39 and its associated connector structure is positioned for alignment with a predetermined one of the apertures 5 in the credit card when the card is properly located in the apparatus. Thus, when the card is slidably inserted into the passageway 28 provided therefor, each pin 39 will be let into its associated aperture 5 as such aperture comes into alignment with such pin. That is, each pin will snap into its associated credit card aperture and project therethrough as the card is inserted into the apparatus. Thereafter, continued movement of the credit card into the passageway 28 with a given pin 39 engaged in an associated aperture 5 will result in the pin drawing its associated connecting link 41 to the left as viewed in FIGS. 4 and 9 through 11. Such movement of link 41 causes counter-clockwise pivotal movement in FIG. 4 of the pivotal arm 53 connected therewith, which in turn positions a portion of the identification indicia applying means, as will be described.

Because, as seen in FIG. 12, the credit card apertures 5 are in staggered relationship relative to each other, determined by the numerical value of the digits defined thereby, the respective pins 39 will be let into their associated apertures at varying stages during insertion of the credit card into the apparatus. Note FIG. 6 in this regard. So that those pins which are not immediately engaged with their associated apertures will not interfere with insertion of the credit card into the apparatus, the aforementioned guide plate 32 is provided with a beveled or recessed edge 57 into which the free end 42 of each connecting link may be depressed by the credit card prior to engagement of an associated pin with an aperture in the credit card as perhaps best seen in FIG. 10. However, when each aperture and its associated pin are properly aligned, the resilience of each connecting link will urge each pin upwardly into the aperture so that the credit card may thereafter effect movement of the link as is seen by comparing FIGS. 10 and 11.

To assist in facilitating insertion of the credit card into its passageway 28, a flexible guide leaf spring 58 is provided across the passageway which normally projects thereinto as seen in FIG. 9. The presence of leaf spring 58 requires the leading edge of the credit card to be placed at initially a downwardly inclined angle relative to the upper surface of the slotted supporting plate 48, as seen in FIG. 9, so that such edge will clear the respective sensing pins 39. It should be understood that initially each of the pins 39 is in the far right orientation seen in FIG. 9. When the leading edge of the credit card has been inserted into the passageway, its body may be pivoted downwardly to depress the spring 58 and allow full insertion of the card into the apparatus so that the respective pins may be sequentially let into engagement with their respective credit card apertures 5.

It should be understood, of course, that in the same manner in which each of the sensing pins 39 is moved toward the left in FIGS. 4 and 9 through 11 during insertion of the credit card into the apparatus, such pins are reversely moved toward their normal position shown in FIG. 9 when the credit card is removed from the apparatus. The position of the respective pins when the credit card is fully inserted into the apparatus is shown in FIG. 6, with such position being determined by the particular identification number depicted by the apertures of the particular card inserted into the apparatus.

The means provided for applying machine readable identification indicia to the record slip 6 is movable in response to automatic orientation of the sensing pins upon engagement thereof in the credit card apertures. Such indicia applying means comprises a series of punch carrying slide members 61 positioned side by side (FIGS. 3 and 8, for example) which are slidably supported on a flat supporting plate 62 which extends across the apparatus between the opposite side walls 17 and 18 thereof. The respective slide members are maintained on the plate 62 by the aforementioned record slip stop plate 26, as seen in FIG. 4. The inner end of supporting plate 62 is supported by a vertical plate 63 which also extends across the housing between the base of supporting plate 62 and the bottom 16 of the housing. As seen in FIGS. 3 and 6, each of the slide members 61 is positioned in the apparatus in accordance with the lateral spacing of the digits of the identification number carried by the credit card and in accordance with the location of the sensing pins 39 engageable therewith. As noted from FIG. 4, the respective sensing pins 39 are operatively connected by the respective connector structures previously described with the respective slide members of the indicia applying means. In this regard, with the embodiment illustrated the inner end of each slide member 61 underlies the record slip receiving passageway and is supported by a downwardly depending supporting column 64 secured thereto which is slidable over the bottom 16 of the housing.

It should be understood that, upon pivotal movement of a pivotal arm 53 about the axis of its mounting shaft 54 in response to movement of a sensing pin 39 and connecting link 41 during insertion of a credit card into the apparatus, the associated slide member is moved to a predetermined orientation beneath the record slip 6 positioned in the apparatus, as seen in FIG. 4. In this connection, each slide member is normally positioned towards the right in FIG. 4 and is moved towards the left in such figure a predetermined amount determined by the extent of movement of the sensing pin 39 associated therewith.

It will be noted further in this regard that the portion of each pivotal arm 53 which extends above the axis of shaft 54 has a length which is twice the length of the portion which lies below the axis of shaft 54. This results in a 2:1 motion amplification ratio between each connecting rod 56 and its associated connecting link 41. That is, by way of specific example, if a pin 39 and associated link 41 are moved approximately ½ inch by the credit card (as when the pin 39 is engaged with the credit card aperture identifying numeral five of the card holder's identification number) the lower portion of the associated pivotal arm will be pivoted a corresponding amount. However, the upper portion of the pivotal arm will be pivoted twice as far, thereby moving its associated slide member twice as far to the left in FIG. 4 as the associated pin 39 and link 41 have been moved by the credit card, namely approximately one inch.

This magnification of movement results in the respective coded indicia punched in the record slip being spaced from each other the distance desirable to permit reading thereof on conventional machinery presently available for that purpose. While a 2:1 ratio of motion magnification has been disclosed herein, other ratios suitable to meet a particular need also may be employed without departing from the concept of this invention. The 2:1 ratio disclosed herein is dictated primarily by the relative sizes of the standard size credit card and record slip illustrated, as is noted by comparing FIGS. 12 and 13.

Each of the slide members includes in conjunction therewith a flexible member for punching a single machine readable indicium in the record slip when its associate slide member has been properly oriented by an associated sensing pin 39. Such indicium applying member comprises an elongated flexible leaf spring 66 which overlies and is normally spaced above the slide member and has one end 67 thereof secured to the slide member in a slot provided therefor, as seen in FIG. 4. A punch element 68 depends from the other end of the leaf spring member 66. Thus it should be understood that each punch carrying spring member 66 moves with its associated slide member 61 in response to activation of the sensing means by insertion or removal of a credit card relative to the apparatus. It should be further understood that the normal resilience of each punch carrying member 66 maintains its associated punch element spaced above the associated slide member 61 so that a record slip to be punched may be inserted therebetween without interference, as seen in FIG. 4.

Each punch element 68 is generally rectangular in cross section and thereby imparts an elongated opening through the record slip when the punch element is depressed. The slide member 61 for each punch element is provided with a passage 69 therethrough which has a configuration conforming closely to but slightly larger than the configuration of the punch element. Passage 69 permits a punch element to be received in the slide member to insure an effective punching operation, and also permits the piece of material punched from the record slip to pass through the slide member for disposal thereof.

Figure 8:
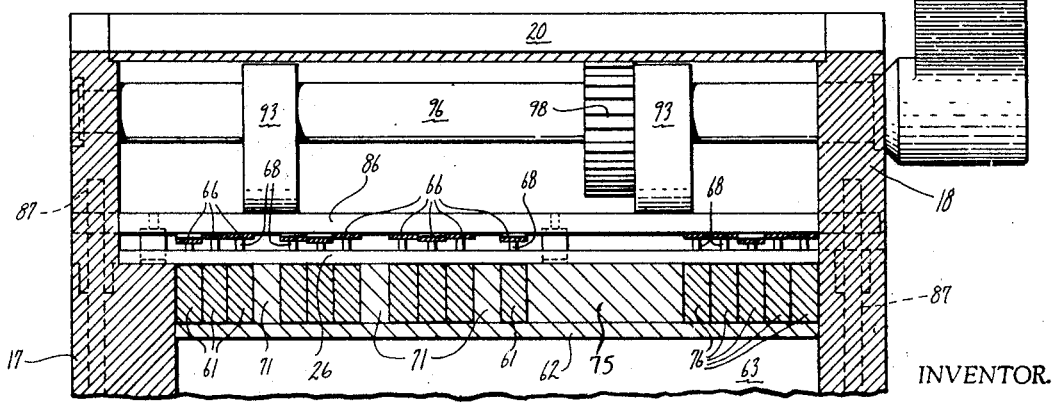
FIG. 8 is a partial vertical sectional view through the apparatus taken in the plane of line 8—8 of FIG. 4.

In accordance with the ten digit identification number provided on the credit card illustrated in which adjacent groups of digits are separated from each other, elongated spacer bars 71 are provided in the apparatus to compensate for such spacing, as seen in FIGS. 3, 6 and 8. That is, spacer bars 71 extend the length of the apparatus between adjacent groups of slide members which are grouped in accordance with the groupings of the identification number digits carried on the credit card. These spacer bars maintain the respective groups of slide members 61 and the punch elements 68 carried thereby in proper alignment during repeated use of the apparatus.

Referring to FIGS. 2, 3 and 5, a second series of slide members 76 is provided in spaced relationship relative to the first series of slide members 66. This latter series is operable independently of the slide members 66 and each of the slide members 76 thereof is selectively positionable by the gasoline station attendant in accordance with the monetary amount of a given credit purchase. As seen in FIG. 8 the series of slide members 76 is separated from the first mentioned series of slide members 66 by a spacer bar 75 which extends longitudinally of the apparatus and is supported on aforementioned plate 62.

Each of slide members 76 has secured thereto, as best seen in FIG. 5, a leaf spring member 77 of the type described previously, from the inner end of which depends a punch element 78. Similarly, each of the slide members 76 as seen in FIG. 6 is provided with a rectangular aperture 79 therein to accommodate an associated punch element during a punching operation.

Each of the slide members 76 adjacent its outer end is additionally provided with a graspable handle 81 which projects upwardly through an enlarged opening 80 provided in the cover of the apparatus housing. Each handle 81 provides means by which each slide member may be selectively positioned in accordance with the monetary amount of the credit purchase to be punched in the record slip which overlies the inner ends of slide members 76.

Provided on the cover of the apparatus, as best seen in FIGS. 2 and 3, is a cost amount scale in conjunction with which the selectively positionable cost indicia slide members 76 are usable. After the amount of a given credit purchase has been determined, it is merely necessary for the gasoline station attendant to locate the respective slide members 76 in conjunction with the amount of the purchase by referring to the cost amount scale on the housing. Thus, by positioning the respective handles 81 opposite the proper numerals on the cost amount scale, the correct amount will be punched in the record slip by punch elements 78 carried by the slide members 68. By way of example, as seen in FIGS. 2 and 3, the credit purchase covered by the location of the slide members therein amount to $2.59, and a similar amount has been punched in the record slip of FIG. 13.

In the embodiment illustrated, five cost amount slide members are used, thereby enabling the apparatus to register sales amounting to $999.99. Obviously more sliders may be provided if the nature of the business with which the apparatus is useable would so require.

Finally, the apparatus includes means for actuating the two series of identification and cost indicia applying punch elements 68 and 78 when the identification indicia slide members 66 have been properly positioned by a credit card and after the cost indicia slide members 76 have been manually located by the service station attendant. In the illustrated embodiment, such actuating means comprises a pressure plate 86 supported for vertical movement by the opposite side walls 17 and 18 of the apparatus housing. In this connection, as seen in FIGS. 3 and 4, the pressure plate is generally rectangular in outline and is slidably mounted at three of its corners on vertically extending pins 87 on the side walls which pass through appropriate holes provided in laterally extending tabs 88 (FIG. 3) on the pressure plate.

Interposed between the lower surface of pressure plate 86 and the bases of the pins 87 are coil springs 89 which normally urge the pressure plate upwardly away from the slide members and the punch members carried thereby, as seen in FIG. 4. Thus, the pressure plate when in its normal position does not interfere with insertion of the record slip 6 into its operative position within the apparatus.

From FIGS. 4, 5 and 11 it will be noted that the pressure plate includes along one margin thereof an elongated depending boss 91 which overlies the outermost margin of the record slip 6 and the innermost margin of the credit card 1 positioned in the apparatus. Thus when the pressure plate is depressed, the boss 91 will urge the record slip against the embossments upstanding from the credit card to effect printing of the identification number and card holder's name thereon, as seen in FIG. 13.

It should also be understood that when the pressure plate descends, it urges each of the punch elements 68 and 78 downwardly therewith to apply the machine readable identification indicia and cost indicia to the record slip located between the punch elements and the slide members which support the punch elements. Thus the punched pattern shown in FIG. 13 is applied to the record slip.

Cam means is provided to actuate the pressure plate, which in the embodiment illustrated comprises four cam members located adjacent the respective corners of the pressure plate as seen in FIG. 2. These cam members are arranged in pairs, designated 92 and 93 respectively, with the cams 92 of one pair being mounted on and secured for rotation with a shaft 94, while the cams 93 of the other pair are similarly mounted on a shaft 96, such shafts extending transversely between the housing side walls and mounted thereon in suitable bearings as seen in FIG. 2.

Located externally of the housing is a depressible operating handle 97 which is keyed to shaft 96 to effect rotation of such shaft in a counter-clockwise direction as seen in FIGS. 4 and 5 when the handle is depressed. In this regard, because cams 93 mounted on shaft 96 normally engage the upper surface of the pressure plate, and because such pressure plate is spring urged upwardly as described previously, shaft 96 is normally spring urged in the clockwise direction of FIGS. 4 and 5 by the pressure plate springs, so that the operating handle 97 is maintained in the elevated position seen in FIG. 8 when not in use.

To effect actuation of the pairs of cams 92 and 93 in unison but in opposite directions when it is desired to depress the pressure plate 86, gears 98 and 99, meshed with each other, are mounted on the respective shafts 96 and 94, as seen in FIGS. 2 and 5. Thus when shaft 96 is rotated in the counterclockwise direction of FIG. 5 in response to depressing of operating handle 97, gear 99 is simultaneously rotated in a clockwise direction to effect clockwise rotation of cams 92. Thus when it is desired to depress the pressure plate to punch a record slip positioned in the apparatus, it is merely necessary for the gasoline station attendant to push down on the operating handle 97.

From the foregoing it should be understood that by using the apparatus disclosed herein at the point of purchase of a credit transaction, it is possible to apply by printing and punching the full credit card holder's identification indicia, and also the full purchase cost indicia, to a record slip which subsequently may be transferred to billing headquarters for immediate insertion into automatic billing machinery without requiring separate handling thereat.

While a preferred embodiment of the apparatus for applying identification and cost indicia to a record slip at the point of purchase has been disclosed herein, it should be understood that such disclosure has been made for purposes of illustrating a preferred embodiment thereof. Modifications to the subject apparatus which may be made without departing from the spirit of this invention are contemplated within its scope, which should be measured in light of the claims appended hereto.

I claim:

1. Mechanical apparatus for applying machine readable indicia, such as a charge customer identification number, onto a record slip in accordance with coded indicia carried by a master card, said indicia constituting a series of openings located in said card in a predetermined pattern determined by the code imparted to said indicia, comprising
    (A) an enclosed housing having an integral cover,
    (B) a first passageway extending into said housing for receiving and positioning a record slip therein in a predetermined location, comprising
        (1) wall structures defining opposed lateral margins of said first passageway,
        (2) a stop plate defining the inner end of said first passageway for limiting insertion of said record slip into said first passageway, and
        (3) support structure for said record slip,
    (C) a second passageway extending into said housing for receiving and positioning a master card therein in a predetermined location relative to said record slip, comprising
        (1) wall structures defining opposed lateral margins of said second passageway,
        (2) a stop plate defining the inner end of said second passageway for limiting insertion of said master card into said second passageway,
        (3) a guide plate at the entrance of said second passageway to insure proper insertion of said master card thereinto, and
        (4) apertured support structure for said master card,
    (D) movable means locatable automatically relative to said record slip in response to sliding insertion of said master card into said second passageway for applying said machine readable indicia to said record slip, comprising
        (1) a series of slide members separately and selectively movable relative to said record slip,
        (2) said slide members being at least equal in number to the number of coded indicia openings carried by said master card,
        (3) an indicium applying element carried by each of said slide members which is selectively engageable with said record slip to apply a machine readable indicium to a predetermined area of said record slip in accordance with automatic positioning of its associated slide member by insertion of said master card into said housing,
        (4) said slide members being locatable relative to said record slip independently of each other in accordance with the respective coded indicia openings in said master card,
    (E) means operatively connected with said slide members for sensing the indicia openings in said master card and for automatically orienting said slide members in predetermined locations relative to said record slip in accordance with the position of the respective indicia openings in said master card, comprising
        (1) a series of sensing pin members over which said master card is slidable normally positioned adjacent the entrance to said second passageway,
        (2) each of said sensing pins being aligned with an indicium opening in said master card for automatic engagement therein as said card is moved thereover, and
        (3) a series of movable connector structures interposed between and operatively interconnecting respective sensing pins with respective slide members, whereby each said slide member is located relative to said record slip by its associated connector structure as such connector structure is moved upon movement of a sensing pin in response to engagement thereof in an indicium opening of said master card, and
    (F) means for actuating each of said indicium applying elements into indicia applying engagement with said record slip when said slide members are positioned relative to said record slip in response to insertion of said master card into said second passageway.

2. The apparatus of claim 1 in which
    (G) each of said indicium applying elements comprises a punch adapted to form an aperture in said record slip.

3. The apparatus of claim 1 in which
    (G) said means for actuating said indicia applying means comprises
        (1) a pressure plate,
        (2) mounting structure supporting said pressure plate for generally vertical movement relative to said indicia applying means and said record slip receiving and positioning means, and
        (3) mechanism for effecting movement of said pressure plate to bring said indicia applying means and said record slip into engagement with each other.

4. The apparatus of claim 1 which also is adapted to apply other machine readable indicia, such as the amount of a credit purchase, onto a record slip, comprising
    (G) other movable means selectively locatable relative to said record slip for applying said other machine readable indicia to said record slip,
        (1) said other movable means also being responsive to activation of said actuating means, and
    (H) manually operable mechanism for orienting said other movable indicia applying means in predetermined locations relative to said record slip in accordance with the other machine readable indicia desired to be applied to such slip, such as the monetary amount of a credit purchase made by the holder of said master card.

5. The apparatus of claim 4 in which
(I) said other movable indicia applying means comprises
(1) a series of discrete slide members separately and selectively movable relative to said record slip,
(2) an indicium applying element carried by each of said slide members which is engageable with said record slip to apply a machine readable indicium thereto when said actuating means is activated, and
(3) a manually engageable member operatively connected with each of said slide members so that each such slide member may be selectively oriented relative to said record slip in accordance with the location desired for the indicium to be applied to said slip thereby.

6. The apparatus of claim 5 in which
(J) each of said indicium applying elements comprises a punch adapted to form an aperture in said record slip.

7. The apparatus of claim 1 in which
(G) each of said connector structures includes
(1) a flexible connecting link operatively secured to its associated sensing member, and
(H) guide means over which said flexible link passes during orientation of an associated slide member relative to said record slip.

8. The apparatus of claim 1 which further includes
(G) means for guiding said sensing pins during movement thereof by said master card, comprising
(1) a slotted guide plate having generally parallel slots therein over which said master card is slidable,
(2) said sensing pins projecting through said slots above said guide plate for engagement in said indicia openings of said master card.

9. The apparatus of claim 1 in which each of said sensing pins is resiliently urged toward said slotted guide plate to facilitate engagement thereof in an associated indicium opening in said master card.

10. The apparatus of claim 1 which further includes
(G) a depressible flexible guide spring normally projecting upwardly across said entrance to said second passageway,
(1) said guide spring requiring insertion of said master card into said second passageway at an angle relative to said support structure for said master card to insure that the leading edge of said card initially will clear said sensing pins.

11. The apparatus of claim 1 in which each of said indicium applying elements comprises
(a) a leaf spring attached at one end to and movable with an associated slide member,
(b) a punch element mounted adjacent an opposite end of said leaf spring,
(c) said punch element being normally spaced from said record slip and being selectively movable into engagement therewith upon movement of said actuating means.

12. The apparatus of claim 1 in which
(G) each of said connector structures comprises
(1) a pivotally mounted arm located intermediate an associated slide member and an associated sensing member,
(2) a connecting link operatively connecting one end of said pivotal arm with an associated sensing member, and
(3) a connecting rod operatively connecting the other end of said pivotal arm with an associated slide member.

13. The apparatus of claim 12 in which
(a) each of said pivotally mounted arms is mounted for movement intermediate its ends on a shaft,
(b) the length of each said arm above the axis of its associated shaft being greater than the length of such arm below said axis, so that amplification of the distance an associated slide member moves upon movement of such arm by an associated sensing member is produced.

References Cited

UNITED STATES PATENTS

| | | | |
|---|---|---|---|
| 2,826,987 | 3/1958 | Eckhoff | 101—19 |
| 3,035,764 | 5/1962 | Beman | 235—61.1 X |
| 3,051,079 | 8/1962 | Platzman et al. | 101—19 |
| 3,059,570 | 10/1962 | Wagner | 101—19 |
| 3,064,560 | 11/1962 | Perry et al. | 101—90 |
| 3,234,358 | 2/1966 | Dashew et al. | 235—61.1 |

DARYL W. COOK, Primary Examiner

R. M. KILGORE, Assistant Examiner

U.S. Cl. X.R.

101—19; 194—4; 234—45, 75; 235—61.1, 61.11